(12) United States Patent  (10) Patent No.: US 8,891,527 B2
Wang  (45) Date of Patent: Nov. 18, 2014

(54) SYSTEMS AND METHODS FOR PACKET FILTERING AND SWITCHING

(75) Inventor: Ning Wang, San Jose, CA (US)

(73) Assignee: Gigamon Inc., Milpitas, CA (US)

( * ) Notice: Subject to any disclaimer, the term of this patent is extended or adjusted under 35 U.S.C. 154(b) by 292 days.

(21) Appl. No.: 13/365,606

(22) Filed: Feb. 3, 2012

(65) Prior Publication Data

US 2013/0201984 A1    Aug. 8, 2013

(51) Int. Cl.
*H04L 12/28*    (2006.01)

(52) U.S. Cl.
USPC .......................................... 370/392; 370/401

(58) Field of Classification Search
None
See application file for complete search history.

(56) References Cited

U.S. PATENT DOCUMENTS

| | | | | |
|---|---|---|---|---|
| 5,920,566 A * | 7/1999 | Hendel et al. | .................. | 370/401 |
| 6,839,349 B2 * | 1/2005 | Ambe et al. | .................. | 370/390 |
| 6,842,457 B1 * | 1/2005 | Malalur | .................. | 370/428 |
| 7,424,018 B2 | 9/2008 | Gallatin et al. | | |
| 7,436,832 B2 | 10/2008 | Gallatin et al. | | |
| 7,440,467 B2 | 10/2008 | Gallatin et al. | | |
| 7,792,047 B2 | 9/2010 | Gallatin et al. | | |
| 7,913,294 B1 | 3/2011 | Maufer et al. | | |
| 8,081,570 B2 * | 12/2011 | Bowes | ......................... | 370/230 |
| 8,315,256 B2 | 11/2012 | Leong et al. | | |
| 2009/0196289 A1 * | 8/2009 | Shankar et al. | ............... | 370/390 |
| 2009/0303883 A1 * | 12/2009 | Kucharczyk et al. | .......... | 370/241 |
| 2010/0135289 A1 * | 6/2010 | Bowes | ......................... | 370/389 |
| 2011/0317694 A1 * | 12/2011 | Pleshek et al. | ................ | 370/389 |

OTHER PUBLICATIONS

International Search Report and Written Opinion dated Apr. 8, 2013 for PCT/US2013/024173, 9 pages.

* cited by examiner

*Primary Examiner* — Eunsook Choi
(74) *Attorney, Agent, or Firm* — Vista IP Law Group, LLP

(57) ABSTRACT

A method of packet processing includes receiving a packet at one of a plurality of network ports at a switch device, tagging the packet with a first identification, tagging the packet with a second identification, using a first table to determine a first set of output port identifications based at least in part on the first identification, using a second table to determine a second set of output port identifications based at least in part on the second identification, and performing a logical operation using the first set of output port identifications and the second set of output port identifications to identify one or more of a plurality of output ports at the switch device.

39 Claims, 8 Drawing Sheets

SYSTEMS AND METHODS FOR PACKET FILTERING AND SWITCHING

FIELD

This application relates generally to network switch devices.

BACKGROUND

Network switches have been used to forward packets from one node to another node. Such network switch devices may include a first network port for receiving packets from a first node, and a second network port for passing the packets to a second node.

In some cases, packet switch devices (appliances) may be used to forward a copy of packets (either obtained through a SPAN port of a switch or router, or by making a copy of each packet through its built-in tap modules) in the packet-switching network, to network monitoring or security tools for analysis thereby. Such packet switch appliances may have one or more network ports for connection to the packet-switching network and one or more instrument ports connected to one or more network instruments for monitoring packet traffic, such as packet sniffers, intrusion detection systems, application monitors, or forensic recorders.

A packet switch device may be configured to pass packets that are received at a network port to an egress port based on a destination IP address. However, the model/technique for configuring such packet switch device may not be employed to implement port-pairing between two or more network ports. Also, the model/technique for configuring such packet switch device may not be employed to implement pass-all configuration (e.g., passing all packets from a port to an egress port regardless of the packet content (such as any of the header information), and/or regardless of whether there is another filtering logic that copies this packet to other egress port(s)). In some cases, a different model/technique may be employed to configure the packet switch device to perform port-pairing and provide pass-all feature. However, Applicant of the subject application determines that using different models/techniques to configure the packet switch device to deal with different network monitoring requirements (situations) may be costly and time consuming to implement, and may make the operation of the device cumbersome, inefficient, and non-flexible. Thus, Applicant of the subject application has determined that it would be desirable to provide new packet switch devices and methods for processing packets.

SUMMARY

In accordance with some embodiments, a method of packet processing includes receiving a packet at one of a plurality of network ports at a switch device, tagging the packet with a first identification, tagging the packet with a second identification, using a first table to determine a first set of output port identifications based at least in part on the first identification, using a second table to determine a second set of output port identifications based at least in part on the second identification, and performing a logical operation using the first set of output port identifications and the second set of output port identifications to identify one or more of a plurality of output ports at the switch device.

In accordance with other embodiments, a packet switch system includes a plurality of network ports, at least one of the plurality of network ports configured to receive a packet, a non-transitory medium storing a first table and a second table, and an integrated circuit configured for tagging the packet with a first identification, tagging the packet with a second identification, using the first table to determine a first set of output port identifications based at least in part on the first identification, using the second table to determine a second set of output port identifications based at least in part on the second identification, and performing a logical operation using the first set of output port identifications and the second set of output port identifications to identify one or more of a plurality of output ports at the switch device.

In accordance with other embodiments, a computer program product includes a non-transitory medium storing a set of instructions, an execution of which causes a method of packet processing to be performed, the method comprising receiving a packet at one of a plurality of network ports at a switch device, tagging the packet with a first identification, tagging the packet with a second identification, using a first table to determine a first set of output port identifications based at least in part on the first identification, using a second table to determine a second set of output port identifications based at least in part on the second identification, and performing a logical operation using the first set of output port identifications and the second set of output port identifications to identify one or more of a plurality of output ports at the switch device.

Other and further aspects and features will be evident from reading the following detailed description of the embodiments.

BRIEF DESCRIPTION OF THE DRAWINGS

The drawings illustrate the design and utility of embodiments, in which similar elements are referred to by common reference numerals. These drawings are not necessarily drawn to scale. In order to better appreciate how the above-recited and other advantages and objects are obtained, a more particular description of the embodiments will be rendered, which are illustrated in the accompanying drawings. These drawings depict only typical embodiments and are not therefore to be considered limiting of its scope.

DESCRIPTION OF THE EMBODIMENTS

Figure 1:
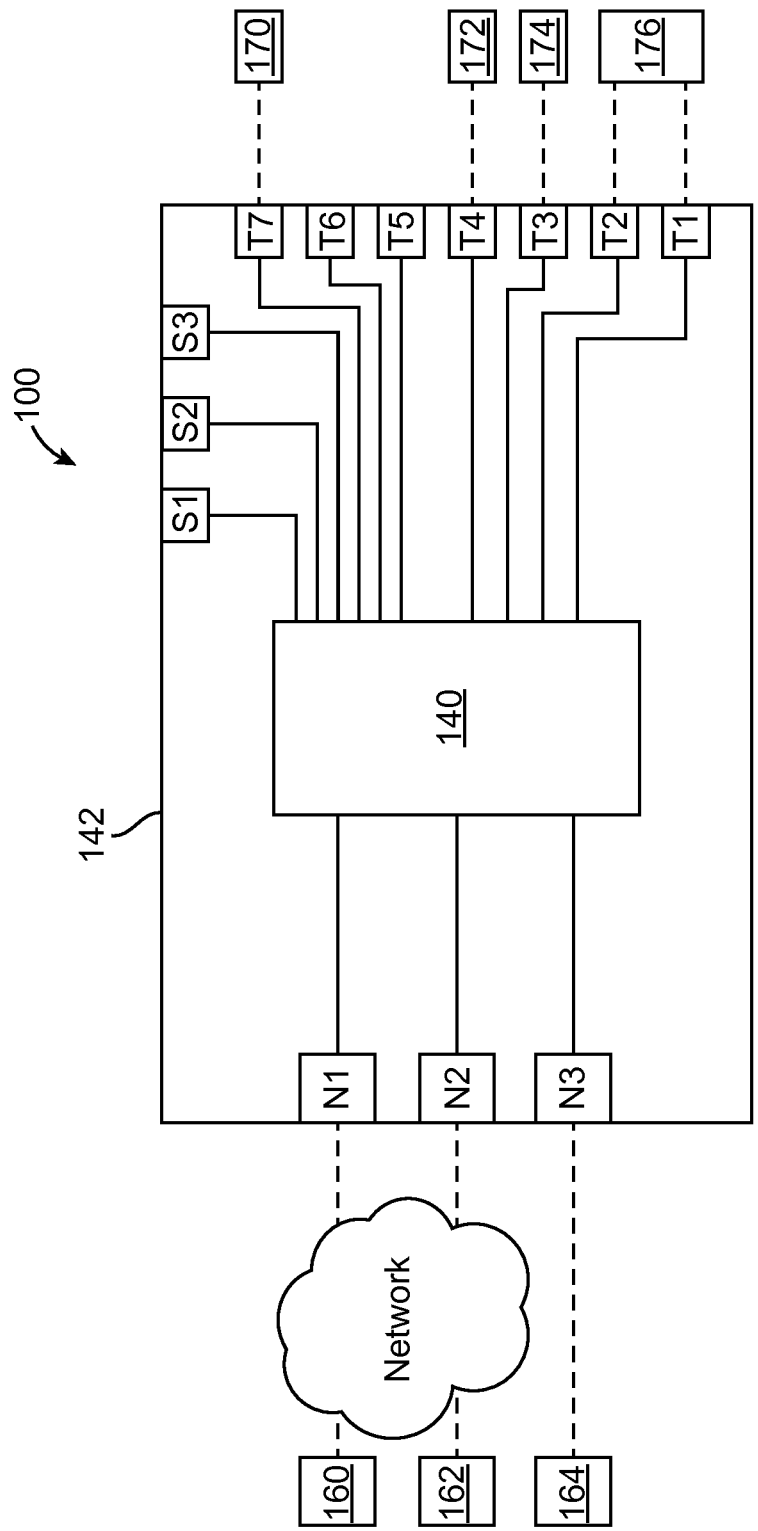
FIG. 1 illustrates a packet switch device in accordance with some embodiments.

Various embodiments are described hereinafter with reference to the figures. It should be noted that the figures are not drawn to scale and that elements of similar structures or functions are represented by like reference numerals throughout the figures. It should also be noted that the figures are only intended to facilitate the description of the embodiments.

They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated.

FIG. 1 illustrates a network switch device 100 that is configured for performing packet filtering and switching in accordance with some embodiments. The network switch device 100 includes network ports N1, N2, N3, and instrument ports T1, T2, T3, T4, T5, T6, T7. The device 100 also includes a packet switch 140, and a network switch housing 142 for containing the packet switch 140. In the illustrated embodiments, the device 100 also includes other components, such as a Network PHY (not shown) coupled to each of the respective ports N1, N2, N3, wherein the Network PHYs may be considered to be parts of the packet switch 140. Alternatively, the Network PHYs may be considered to be components that are separate from the integrated circuit 140. The PHY is configured to connect a link layer device to a physical medium such as an optical fiber, copper cable, etc. In other embodiments, instead of the PHY, the device 100 may include an optical transceiver, or a SERDES, etc. The housing 142 allows the device 100 to be carried, transported, sold, and/or operated as a single unit. The ports N1-N3 and T1-T7 are located at a periphery of the housing 142. In other embodiments, the ports N1-N3 and T1-T7 may be located at other locations relative to the housing 142. Although three network ports N1-N3 are shown, in other embodiments, the device 100 may include more than three network ports N, or fewer than three network ports N. Also, although seven instrument ports T1-T7 are shown, in other embodiments, the device 100 may include more than seven instrument ports T, or fewer than seven instrument ports T.

In some cases, the device 100 is provided as a single unit that allows the device 100 to be deployed at a single point along a communication path. In the illustrated embodiments, the packet switch 140 is configured to receive packets from nodes 160, 162, 164 via the network ports N1, N2, N3, and process the packets in accordance with a predefined scheme. For example, during use, the network ports N1-N3 of the device 100 may be communicatively coupled to a first node 160, a second node 162, and a third node 164, respectively. The device 100 may be configured to communicate packets between any two of the nodes 160, 162, 164 via the network ports N1-N3. Also, during use, one or more of the instrument ports T1-T7 of the device 100 may be communicatively coupled to respective instruments. In the illustrated example, four instruments 170, 172, 174, 176 are shown. The instruments 170-176 may be directly coupled to the device 100, or communicatively coupled to the device 100 through the network (e.g., Internet). The packet switch 140 may pass packets received from one or more nodes to one or more instruments that are connected to one or more of the instrument port(s) T1-T7.

In some embodiments, the packet switch 140 may be any switch module that provides packet transmission in accordance with a pre-determined transmission scheme. In some embodiments, the packet switch 140 may be user-configurable such that packets may be transmitted in a one-to-one configuration (i.e., from one network port to an instrument port). As used in this specification, the term "instrument port" refers to any port that is configured to transmit packets to an instrument, wherein the instrument may be a non-pass through device (i.e., it can only receive packets intended to be communicated between two nodes, and cannot transmit such packets downstream), such as a sniffer, a network monitoring system, an application monitoring system, an intrusion detection system, a forensic storage system, an application security system, etc., or the instrument may be a pass-through device (i.e., it can receive packets, and transmit the packets back to the device 100 after the packets have been processed), such as an intrusion prevention system. In other embodiments, the packet switch 140 may be configured such that the packets may be transmitted in a one-to-many configuration (i.e., from one network port to multiple instrument ports). In other embodiments, the packet switch 140 may be configured such that the packets may be transmitted in a many-to-many configuration (i.e., from multiple network ports to multiple instrument ports). In further embodiments, the packet switch 140 may be configured such that the packets may be transmitted in a many-to-one configuration (i.e., from multiple network ports to one instrument port). In some embodiments, the one-to-one, one-to-many, many-to-many, and many-to-one configurations are all available for allowing a user to selectively configure the device 100 so that the packets (or certain types of packets) are routed according to any one of these configurations. In some embodiments, the packet movement configuration is predetermined such that when the device 100 receives the packets, the device 100 will automatically forward the packets to the ports based on the predetermined packet movement configuration (e.g., one-to-one, one-to-many, many-to-many, and many-to-one). Also, in some embodiments, the automatic forwarding of the packets to the port may be performed by the device 100 without the need to analyze the packets (e.g., without the need to examine the header, determine the type of packets, etc.). In other embodiments, the device 100 may be configured to analyze some information at the packet (e.g., at the header).

Examples of packet switch 140 that may be used to implement features described herein include any of the commercially available network switch devices, such as GigaVUE™, that is available at Gigamon LLC. Other examples of packet switch 140 that may be used to implement features described herein are described in U.S. patent application Ser. Nos. 12/148,481, 12/255,561, 11/123,273, 11/123,465, and 11/123,377, the entire disclosure of all of which is expressly incorporated by reference herein.

In accordance with some embodiments, the packet switch 140 may have the functionalities of a conventional packet switch except that it provides visibility into various parts of a network. Thus, embodiments of the packet switch 140 may operate like a conventional managed packet switch, but providing packet monitoring function. This is accomplished by configuring the packet switch 140 to operate as a circuit switch under certain circumstances. In some embodiments, the configuring of the managed packet switch may be performed by utilizing a CPU interface of the switch to modify appropriate registers and memories in the switch to allow for the desired operation. Also, in some embodiments, the packet switch 140 may be an "out-of-band" network switch, which is configured to obtain packets and pass them to an instrument or to a network that is different from that associated with the original intended destination of the packets.

It should be noted that the packet switch 140 that may be used with the device 100 is not limited to the examples described above, and that other packet switches 140 with different configurations may be used as well. Also, in any of the embodiments described herein, the packet switch 140 may be implemented using an integrated circuit, such as a processor (e.g., a general purpose processor, a network processor, an ASIC processor, a FPGA processor, etc.). In some embodiments, the processor may include a non-transitory medium, and/or may couple to a non-transitory medium.

In some embodiments, the packet switch device 100 may be configured to implement one or more network monitoring requirements. For example, the packet switch device 100 may be configured to implement the following four network monitoring requirements:

1. All packets from N1 and N2 with destination IP (DIP) address=192.168.0.1 are to be filtered to instrument ports T4-T7, and stacking ports S1-S3.
2. All packets from N1 and N2 with DIP=10.0.1.3 are to be dropped (e.g., blocked from going to any instrument port).
3. Pass all packets from N1 to instrument ports T1-T3 (this requirement trumps requirement 2 above for packets with DIP=10.0.1.3).
4. Do port-pairing between network ports N2 and N3.

It should be noted that the number of requirements may be different from the examples described, and that the packet switch device 100 may be configured to implement other types of network monitoring requirements.

Also, in some embodiments, one or more of the instrument ports T1-T7 may be grouped into one or more groups. Such may be desired, for example, when two or more of the instrument ports T are to be coupled to an instrument, in which cases, the grouped instrument ports may be used to implement link aggregation. For example, in some embodiments, the instrument ports T1, T2 may be grouped into a link aggregation group LAG1, and instrument ports T4, T5, T6 may be grouped into a link aggregation group LAG2. It should be noted that the instrument ports may be grouped for other purposes that are different from link aggregation in other embodiments.

In addition, in some embodiments, two or more stacking ports S may be grouped. For example, in some embodiments, the stacking ports S2, S3 may be grouped (trunked) together with trunk name Trunk1. In some cases, Trunk 1 may be used as an uplink in a stacking configuration in which two or more of the devices 100 are stacked together.

Figure 2:
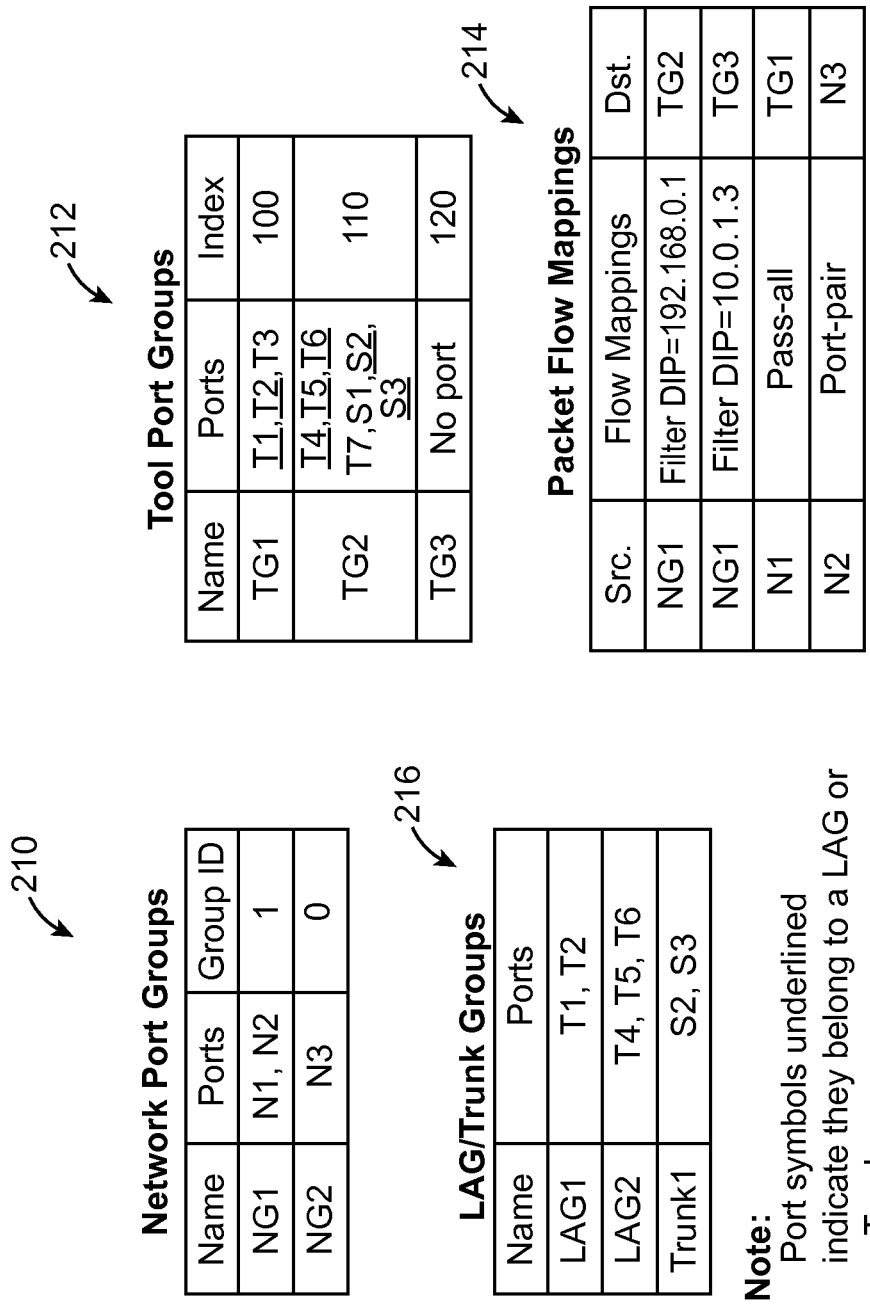
FIG. 2 illustrates examples of tables created using user input in accordance with some embodiments.

In some embodiments, a user of the network switch device 100 may configure the network switch device 100 to implement various network monitoring requirements, such as the examples of the requirement Nos. 1-4 discussed above. The user may also enter input for grouping instrument ports T, grouping stacking ports S, or both. Following the above examples of the network monitoring requirements (i.e., the examples of the requirements Nos. 1-4 described above), the user of the packet switch device 100 may enter input to the device 100 for creating three tables 210, 212, 214 for implementing the desired network monitoring requirements (FIG. 2). In particular, based on the requirements 1 and 2 in the above example, the user may create a first network port group NG1 (that includes N1 and N2), and a second network port group NG2 (which includes only N3) (see table 210). As shown in the figure, the device 100 may be configured to automatically assign group IDs "1", "0", for the created network port groups NG1, NG2, respectively. Alternatively, the group IDs may be assigned by the user of the device 100.

In addition, based on the requirements 1-4 in the above example, the user may enter input to create a tool port group table 212. As shown in the table 212, instrument ports T1, T2, T3 belong to tool port group TG1 (which may be used to implement requirement No. 3 above—i.e., Pass all packets from N1 to instrument ports T1-T3). Also, in the table 212, T4-T7 and S1-S3 belong to tool port group TG2 (which may be used to implement requirement No. 1 above—i.e., All packets from N1 and N2 with destination IP (DIP) address=192.168.0.1 are to be filtered to instrument ports T4-T7, and stacking ports S1-S3.). Also, as shown in the table 212, the tool port group TG3 does not include any port, wherein such tool port group may be used to implement requirement No. 2 above—i.e., All packets from N1 and N2 with DIP=10.0.1.3 are to be dropped. As shown in the figure, the device 100 may be configured to automatically assign Indices "100", "110", "120" for the created tool port groups TG1, TG2, TG3, respectively. The Indices "100", "110", "120" may be used by the device 100 to refer to the created tool port groups TG1, TG2, TG3, respectively. Alternatively, the Indices may be assigned by the user of the device 100. Also, in other embodiments, the Indices are optional, and the table 212 may not include the Indices.

The user of the device 100 may also create a packet flow mapping table 214 to prescribe how packets are to be passed to the different tool port groups and/or ports based on the network monitoring requirements Nos. 1-4 above. As shown in the figure, the first column in the table 214 includes sources of packets, the second column in the table 214 includes packet flow mapping, and the third column in the table 214 includes port destination(s) at the device 100 for the packets. As shown in the table 214, each of the rows prescribes how packets from source(s) are to be passed to which port(s) at the device 100. For example, according to the first row, all packets from network port group NG1 (which includes network ports N1 and N2 in the example) and having DIP=192.168.0.1 are to be passed to tool port group TG2 (which includes instrument ports T4-T6 and stacking ports S1-S3 in the example). According to the second row, all packets from network port group NG1 (which includes network ports N1 and N2 in the example) and having DIP=10.0.1.3 are to be passed to tool group TG3 (which has no associated ports—meaning that group TG3 is a logical group for dropping packets). Also, according to the third row, all packets from network port N1 are to be passed to tool group TG1 (which includes instrument ports T1, T2, T3 in the example) regardless of the DIP address. In addition, according to the fourth row, all packets from network port N2 are to be passed to network port N3, and vice versa, for port-pairing (which is for implementing the network monitoring requirement No. 4 in the above example).

As shown in FIG. 2, to implement the link aggregation requirements and the stacking ports grouping requirements in the example above, the user of the device 100 may also create LAG/Trunk table 216. In the table 216, the group LAG1 is created to group instrument ports T1, T2, the group LAG2 is created to group instrument ports T4, T5, T6, and the group Trunk 1 is created to group the stacking ports S2, S3.

In some embodiments, the tables 210, 212, 214, 216 may be created by the device 100 in response to input entered by the user of the device 100. For example, for the table 210, the user may enter the name "NG1" and the port identifications N1, N2. The device 100 may then automatically create the table 210 by associating the network port group NG1 with the ports N1, N2. Similarly, for the table 212, the user may enter the tool port group name "TG1", and the port identifications T1, T2, T3. The device 100 may then automatically create the table 212 by associating the tool port group TG1 with the ports T1, T2, T3. For table 214, the user may enter the various entries, e.g., "NG1", "Filter DIP=192.168.0.1", "TG2". The device 100 may then automatically create the table 214 by associating these entries with each other. For the table 216, the user may enter the LAG group name "LAG1" and the port identifications, T1, T2. The device 100 may then automatically create the table 216 by associating the LAG group name LAG1 with the instrument ports T1, T2.

It should be noted that the tables for the device 100 are not limited to the examples described, and that the device 100 may create and/or use other tables in other embodiments. For example, in other embodiments, two or more of the tables 210-216 may be combined. Also, in other embodiments, one or more of the tables 210-216 may be represented as two or more sub-tables. Thus, as used in this specification, the term "table" should not be limited to one table, and may refer to one or more tables. Furthermore, as used in this specification, the term "table" is not limited to data that are arranged in table form, and may refer to any set(s) of data that are stored under any data structure, or that are associated with other data. For example, in some embodiments, a table may be two data that are associated with each other using any technique (e.g., using pointer, metadata, etc.).

Figure 3:
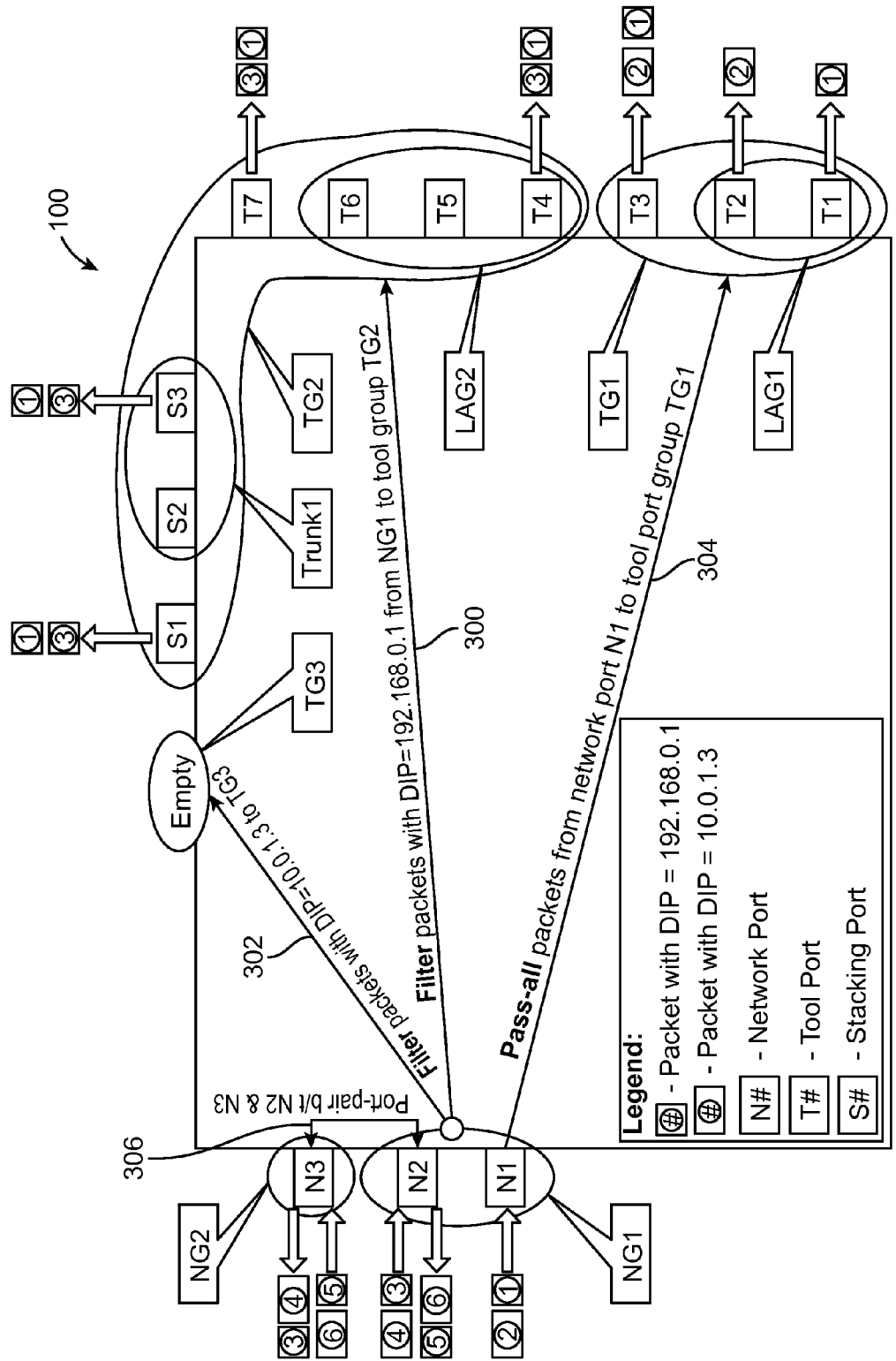
FIG. 3 illustrates an example of a packet flow mapping for the packet switch device of FIG. 1 in accordance with some embodiments.

FIG. 3 illustrates an example of a packet flow mapping for the packet switch device of FIG. 1 using the above example of the network monitoring requirements in accordance with some embodiments. The packet flow mapping illustrates the packet transmission configuration according to the examples of network monitoring requirements Nos. 1-4 described previously. The packet flow mapping also illustrates how the various ports are grouped. As shown in the figure, network ports N1, N2 are grouped into NG1, and the instrument ports T4-T7 and stacking ports S1-S3 are grouped into TG2, for configuring the device 100 to implement the first network monitoring requirement in the above example—i.e., the requirement that all packets from N1 and N2 with destination IP (DIP) address=192.168.0.1 are to be filtered to instrument ports T4-T7, and stacking ports S1-S3 (see arrow 300). Also, TG3 has an empty membership for implementing the second network monitoring requirement in the above example—i.e., the requirement that all packets from N1 and N2 with DIP=10.0.1.3 are to be dropped (see arrow 302). Instrument ports T1-T3 are grouped into TG1 for implementing the third network monitoring requirement in the above example—i.e., the requirement that all packets from N1 are to be passed to instrument ports T1-T3 (see arrow 304). In addition, the network port N3 belongs to network port group NG2 for implementing the fourth network monitoring requirement in the above example—i.e., the requirement that port-pairing be performed between network ports N2 and N3 (see arrow 306).

Also, as shown in the figure, instrument ports T1, T2 are grouped into LAG1, and instrument ports T4-T6 are grouped into LAG2, for respective link aggregations to connect to respective instrument devices for network monitoring. Furthermore, stacking ports S2, S3 are grouped into Trunk1 for implementing an uplink, which may be involved when multiple devices 100 are communicatively stacked together.

As shown in the example in FIG. 3, during use, network port N1 may receive packets 1, 2, network port N2 may receive packets 3, 4, and network port N3 may receive packets 5, 6. Also, in the illustrated example, packets 1, 3, 5 have DIP=192.168.0.1, and packets 2, 4, 6 have DIP=10.0.1.3. Based on the examples of the network monitoring requirements (i.e., requirements 1-4 described above), and based on the link aggregations and trunking of the stacking ports described, the various packets 1-6 will be passed to the instrument ports T and the stacking ports S in the manner shown in the figure.

Figure 4:
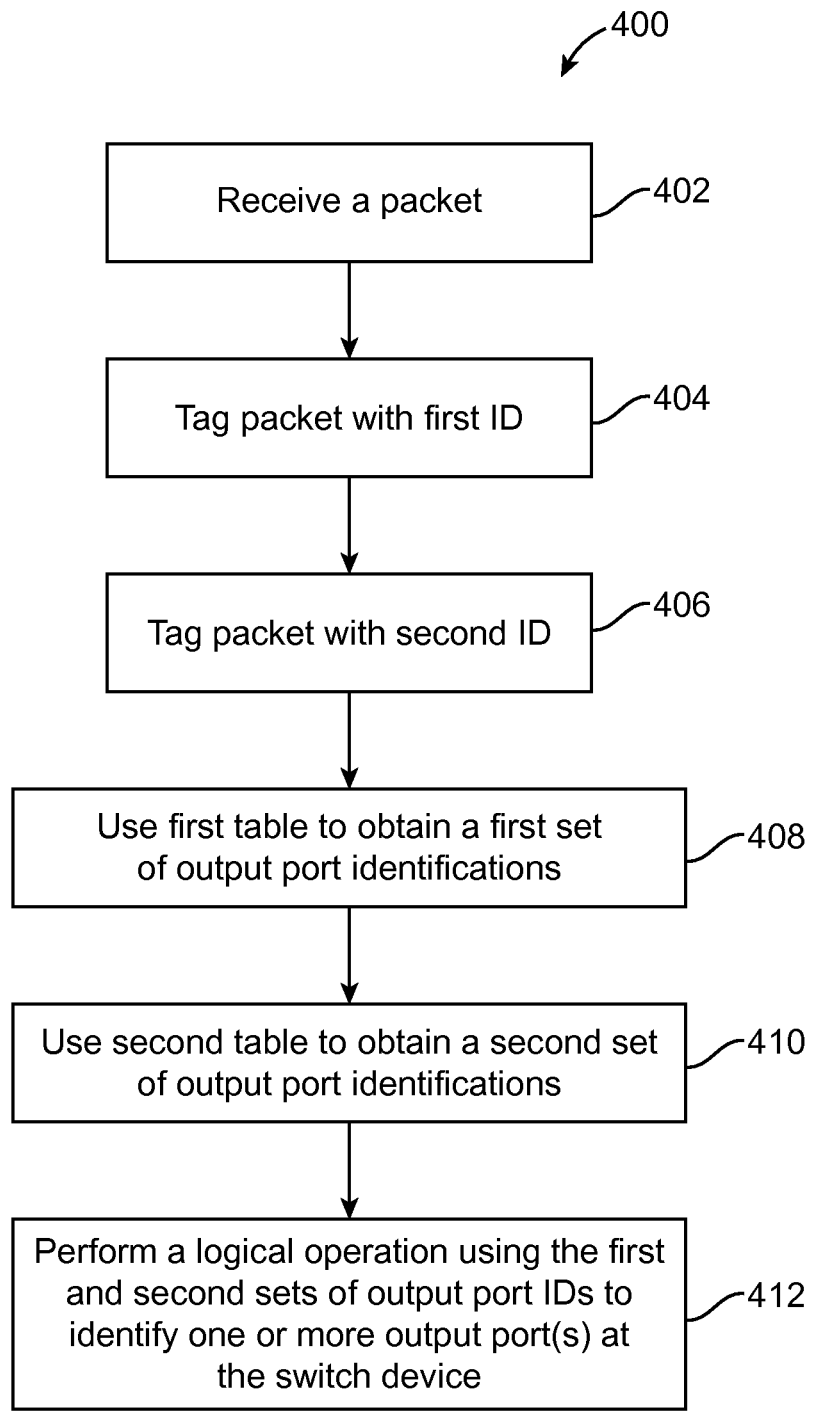
FIG. 4 illustrates a method performed by the packet switch device of FIG. 1 in accordance with some embodiments.
Figure 5:
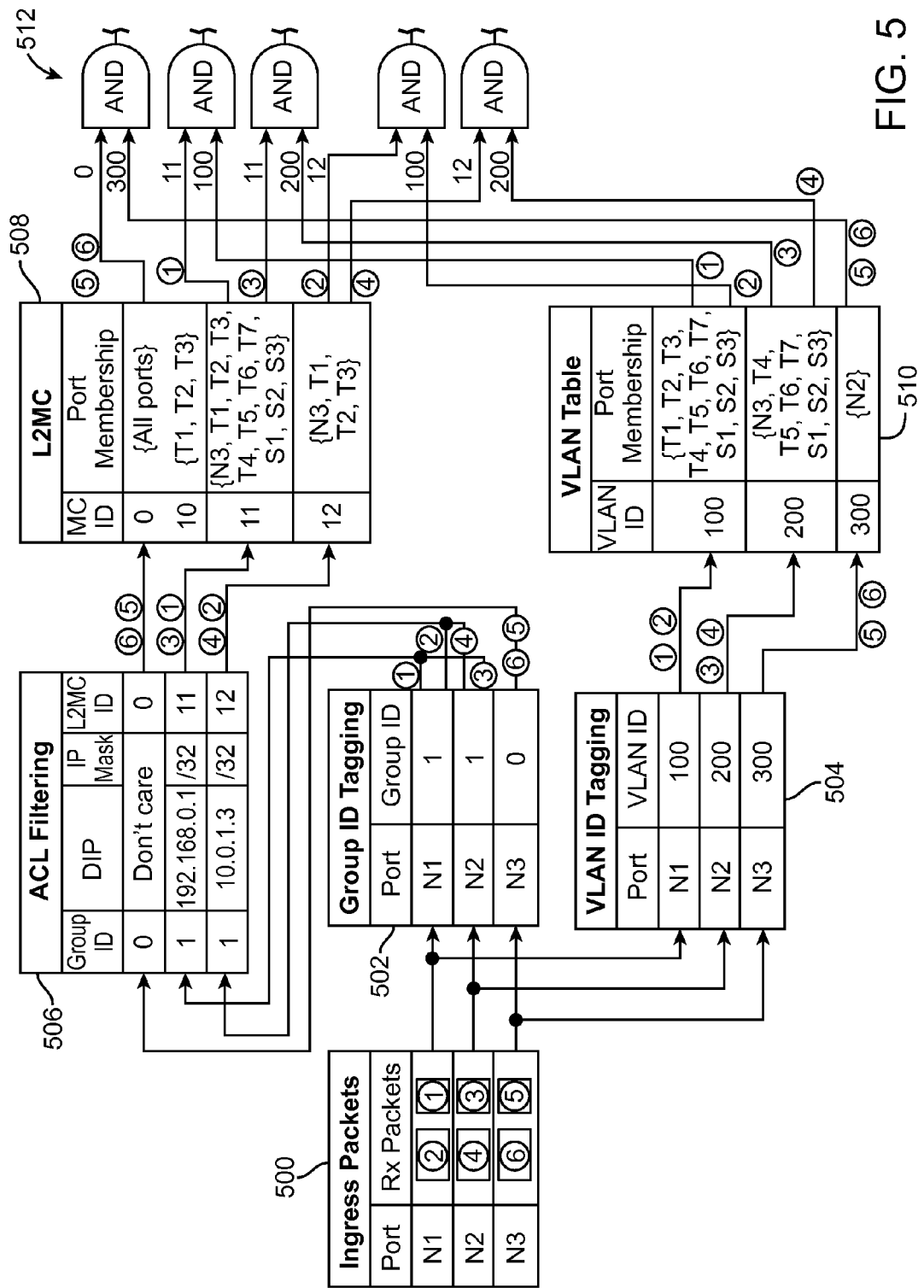
FIG. 5 illustrates an example of packet processing that may be performed by the packet switch device of FIG. 1 in accordance with some embodiments.
Figure 5:
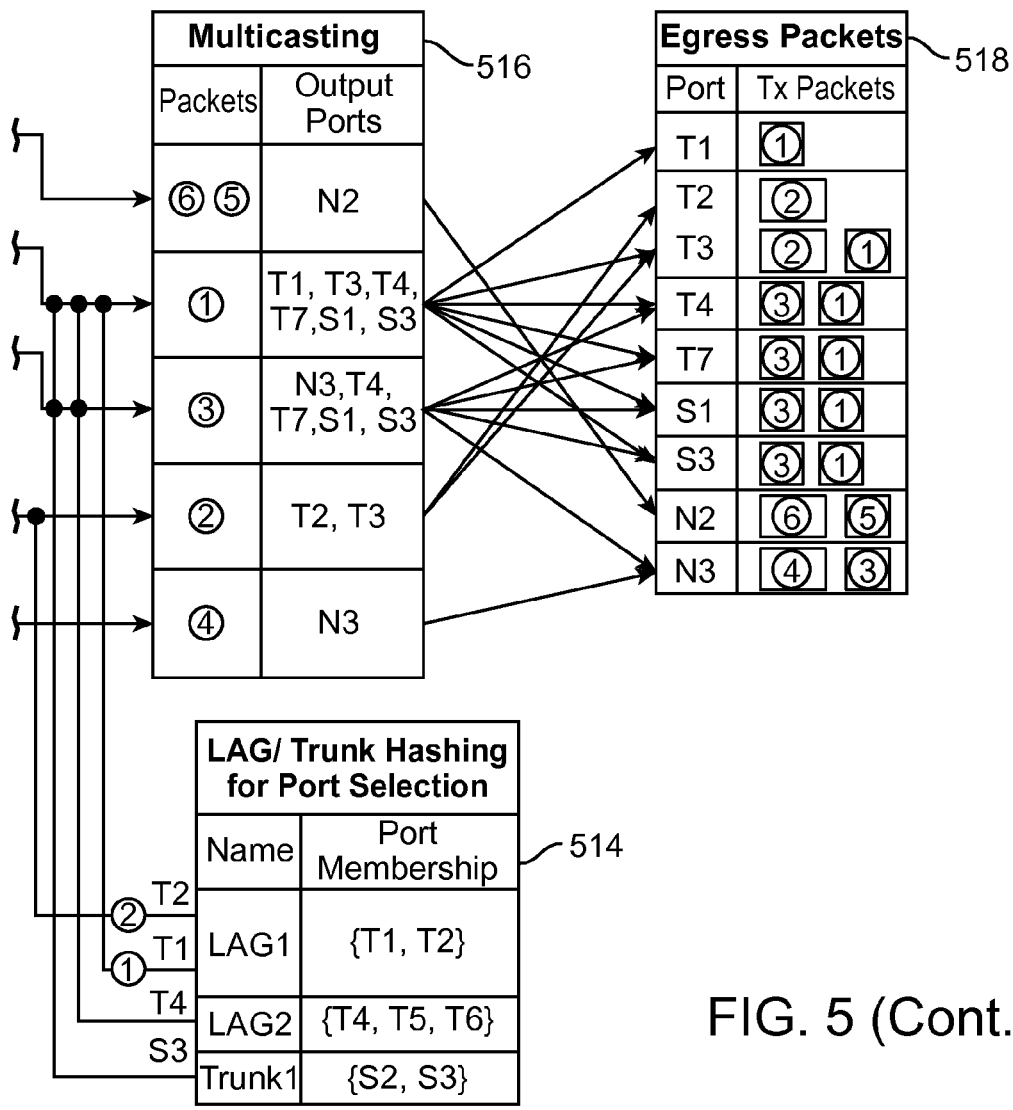

FIG. 4 illustrates a method 400 performed by the packet switch device 100 of FIG. 1 in accordance with some embodiments. The method 400 will be described with reference to the examples of the network monitoring requirements (i.e., the requirements Nos. 1-4) described previously. However, it should be noted that the device 100 may be configured to implement other network monitoring requirements in other embodiments. Also, any of the examples of the requirements Nos. 1-4 may be optional in other embodiments. Also, method 400 will be described with reference to a packet processing technique that is illustrated in FIG. 5. However, it should be understood that in other embodiments, the method 400 may be implemented using other packet processing techniques.

First, the device 100 receives a packet at one of a plurality of network ports N (Item 402). Next, the received packet is tagged with a first identification (Item 404), and the packet is tagged again with a second identification (Item 406). In some embodiments, the first identification may be a group identification (Group ID), and the second identification may be a VLAN identification (VLAN ID). In other embodiments, the first identification may be a VLAN identification, and the second identification may be a group identification. Also, in some embodiments, the tagging of the VLAN identification may be accomplished by tagging the VLAN identification once or twice to the packet. In further embodiments, for the first tagging (i.e. Group ID tagging) function, it may not necessarily be completely different from the second tagging (i.e. VLAN ID tagging). For example, in other embodiments, the first tagging may use the VLAN ID (with VLAN ID range manipulation), like that for the second tagging, as an optional Group ID tagging scheme. In some cases, such technique may be used if a packet switch hardware has no advanced port grouping function/feature available.

During use, the device 100 will receive additional packets at any one of the ports N, and each of the received packets will be tagged twice. In some embodiments, network ports N1-N3 may be associated with respective VLAN identifications, e.g., VLAN ID 100, 200, 300, respectively. In such cases, to follow the above example in FIG. 3, when the device 100 receives the packets 1-6, the device 100 tags packets 1, 2 with group identification "1" (based on the table 210) and with VLAN identification "100", the device 100 tags packets 3, 4 with group identification "1" (based on the table 210) and with VLAN identification "200", and the device 100 tags packets 5, 6 with group identification "0" (based on the table 210) and with VLAN identification "300".

FIG. 5 illustrates an example of packet processing that may be performed by the packet switch device 100 of FIG. 1 using the above examples, in accordance with some embodiments. As shown in the figure, item 500 represents the receiving of the packets 1-6 at the corresponding network ports N1, N2, N3. Item 502 illustrates the tagging of the packets from the respective ports N1, N2, N3 (i.e., packets 1, 2 from port N1 tagged with group ID "1", packets 3, 4 from port N2 tagged with group ID "1", and packets 5, 6 from port N3 tagged with group ID "0"). Also, item 504 illustrates the second tagging of the packets (i.e., packets 1, 2 received at port N1 are tagged with VLAN ID "100", packets 3, 4 received at port N2 are tagged with VLAN ID "200", and packets 5, 6 received at port N3 are tagged with VLAN ID "300").

Returning to FIG. 4, next, the device 100 uses a first table to determine a first set of output port identifications based at least in part on the first identification (Item 408). In the illustrated example, the first identification is the Group ID that is tagged with the received packet. In some embodiments, the first table may associate different Indices with corresponding sets of port identifications (port memberships), and thus, based on a certain Index for the received packet, a corresponding set of output ports may be determined according to the association. The Index for the received packet may be determined based on the Group ID for the network port at which the packet is received, and also based on the destination IP address for the received packet. As shown in table 506 of FIG. 5, based on the Group ID that is associated with the network port N at which the packet is received, as well as the destination IP address for the packet, the device 100 may be configured to determine a corresponding Index. Following the above example, packet 1 is received from network port N1, which is associated with Group ID "1", and has destination IP address=192.168.0.1. Thus, according to table 506, the corresponding Index for packet 1 is "11". Packet 2 is received from network port N1, which is associated with Group ID "1", and has destination IP address=10.0.1.3. Thus, according to table 506, the corresponding Index for packet 2 is "12". Packet 3 is received from network port N2, which is associated with Group ID "1", and has destination IP address=192.168.0.1. Thus, according to table 506, the corresponding Index for packet 3 is "11". Packet 4 is received from network port N2, which is associated with Group ID "1", and has destination IP address=10.0.1.3. Thus, according to table 506, the corresponding Index for packet 4 is "12". Packets 5, 6 are received from network port N3, which is associated with Group ID "0". According to table 506, regardless of the destination IP address, the corresponding Index for packets 5, 6 is "0".

It should be noted that the table 506 is not limited to the example described, and that the table 506 may have other configurations in other embodiments. For example, in other embodiments, the table 506 may be configured to associate Indices with other parameters instead of, or in addition to, the Group IDs and destination IP addresses. Also, in one or more embodiments, the table 506 may be implemented using access control list (ACL) filtering or TCAM filtering.

Once the Index for the packet has been determined (e.g., through table 506), the Index may then be used to determine a corresponding set of output ports. As shown in the table 508 (which is an example of the "first table" in Item 408 of the method 400) of FIG. 5, each Index is associated with a corresponding set of output ports. Following the above example, packets 1, 3 have Index=11, and therefore, according to table 508, the corresponding set of output ports for packets 1, 3 is {N3, T1-T7, and S1-S3}. Packets 2, 4 have Index=12, and therefore, according to table 508, the corresponding set of output ports for packets 2, 4 is {N3, T1-T3}. Packets 5, 6 have Index=0, and therefore, according to table 508, the corresponding set of output ports for packets 5, 6 is {All ports}. In some embodiments, {All ports} may be used as a system default entry to include all possible egress ports. In the above example, the entry for Index=0 may alternatively be {N2}.

It should be noted that each of the sets of output ports in the table 508 represents all possible ports to which a packet with a certain Group ID and destination IP address may be passed. For example, with respect to the set of ports associated with Index 11 in table 508, all packets with Group ID "1" and destination IP address=192.168.0.1 may be passed to ports T4-T7 and S1-S3 (based on requirement No. 1 in the above example). However, due to requirement No. 3 (i.e., pass all packets from port N1 to T1-T3 regardless of the destination IP address), it is also possible that a packet with Group ID 1 and destination IP address=192.168.0.1 be passed to ports T1-T3. Also, due to requirement No. 4 (i.e., port-pairing between port N2 and port N3), it is possible that a packet from port N2 with Group ID1 and destination IP address=192.168.0.1 be passed to port N3. Thus, the row in table 508 corresponding to index=11 (for Group ID=1 and destination IP address=192.168.0.1) has the set={T4-T7 and S1-S3 from requirement No. 1, T1-T3 from the pass-all requirement, and N3 from the port-pairing requirement}.

Similarly, with respect to the set of ports for Index 12 in table 508, all packets with Group ID "1" and destination IP address=10.0.1.3 would be dropped (based on requirement No. 2 in the above example). So the set for index 12 (corresponding to Group ID 2 and destination IP address=10.0.1.3) should be an empty set based on the requirement No. 2. However, due to requirement No. 3 (i.e., pass all packets from port N1 to T1-T3 regardless of the destination IP address), it is also possible that a packet with Group ID 1 and destination IP address=10.0.1.3 be passed to ports T1-T3. Also, due to requirement No. 4 (i.e., port-pairing between port N2 and port N3), it is possible that a packet from port N2 with Group ID1 and destination IP address=10.0.1.3 be passed to port N3. Thus, the row in table 508 corresponding to index=12 (for Group ID=1 and destination IP address=10.0.1.3) has the set={N3 from the port-pairing requirement, and T1-T3 from the pass-all requirement}.

With respect to the Index 0 in table 508, all packets with Group ID "0" received from network port N3 are required to be passed to port N2 due to requirement No. 4 in the above example (i.e., for port pairing between N2 and N3). Thus, the row in table 508 for index 0 (corresponding to Group ID 0) should have the set {N2}. Alternatively, as shown in the figure, the row in table 508 for index 0 may be {All ports}. As will be explained below, regardless of whether {N2} or {All ports} is used in the table 508, the method 400 will provide the same output result.

In some embodiments, {All ports} may be a system default configuration to capture all possible egress ports (like a collector). Using {All ports} may be advantageous because it may be used to support all kinds of network monitoring situations, and allows sharing of expensive lookup resource, regardless of the number of possible egress ports. For example, if the user of the device 100 wishes to add in two additional network ports N4 and N5, and do port-pair between N4 and N5 only. Without using {All ports} in table 508 for sharing, the device 100 will need to create two more entries in table 506, two more rows in table 508, and two more rows in table 510 for the two new ports N4, N5, in order to implement the addition of network ports N4, N5, and port-pairing between these additional ports. Alternatively, if {All ports} is used for Index 0 in table 508 to represent sharing, then the device 100 only needs to add two rows in table 510 for the new ports N4, N5, and does not need to create any new entries in tables 506, and 508.

In some embodiments, the table 508 may be created by the network switch device 100 based on input enter by a user of the device 100. For example, in some embodiments, by processing the network port grouping information and the packet flow mapping information (e.g., the information in the tables 210, 214), the device 100 (e.g., the processor in the device 100) can determine different sets of ports that correspond with different network port groups (e.g., NG1, NG2) and destination IP addresses, wherein each set represents all possible output ports to which a packet (that belongs to a certain network port group and that has a certain destination IP address) may be passed. In other embodiments, the table 508 may be created by a user of the network switch device 100.

As illustrated in the above example, by including in the table 508 network port identification (e.g., network port identification N3 in the last row of the table 508 in the example) that is involved in port-pairing, the device 100 may be configured to implement port-pairing using the same model that is also for packet filtering (e.g., the same model for passing packets based on destination IP address, etc.). Also, by including in the table 508 port identification (e.g., instrument port identifications T1-T3 in the last row of the table 508) for ports that are involved in pass-all configuration, the device 100 may be configured to implement pass-all configuration using the same model that is also for packet filtering (e.g., the same model for passing packets based on destination IP address, etc.).

It should be noted that the "first table" in item 408 of method 400 is not limited to the example described with reference to table 508, and that the first table may have other configurations in other embodiments. For example, in other embodiments, the first table may include information in the table 506. In some cases, the first table may be a combination of tables 506, 508. In one implementation, such combination may be achieved by eliminating the Indices in table 506, and replacing them with the different sets of output ports from table 508. Such technique has the benefit of associating each set of output ports directly with a corresponding Group ID and destination IP address without going through an index.

Furthermore, in some embodiments, the first table may be configured for Layer-2 processing. For example, in some embodiments, the first table may be a table used to implement layer-2 multicast function in the switch device 100. Using the table for the layer-2 multicast function as the first table is advantageous because it will not trigger a modification of the packet (e.g., the header part of the packet). In other embodiments, the first table may be any table configured for other types of processing. For example, in other embodiments, the first table may be a L3 IPMC table configured (e.g., forced) to do the L2 switching only (e.g., by disabling the L3 routing part of the IPMC and keeping the L2 switching part). In network switching, the L3 IP multicast function (IPMC) may be a supper set of L2MC. IPMC has two parts of port group definitions, which include L2 port group and L3 port group. The L2 port group part of an IPMC may do the same thing as the L2MC (e.g., for L2 port group part of an IPMC entry, the switch may simply broadcast packets out without any modification), while for the L3 port group, the switch may change the header part of a packet (e.g., it may change the L2 MAC header). Thus, in some embodiments, the L3 port group part of the IPMC may be disabled, and the L2 port group part of the IPMC may be kept. In such cases, the IPMC table (for L3 IPMC) may be used to implement the same function as that for L2MC. Furthermore, in other embodiments, the two tables for L2MC and IMPC may be combined, thereby providing more entries and more resources to support future lookup.

Returning to FIG. 4, next, the device 100 uses a second table to determine a second set of output port identifications based at least in part on the second identification (Item 410). In some embodiments, the second identification may be a VLAN identification. As shown in FIG. 5, the second table may be a VLAN table 510, which associates various VLAN IDs with respective port memberships. In the illustrated example, each port membership lists all possible ports to which a packet may be sent based on the network port from which the packet is received. For example, VLAN ID 100 (corresponding to network port N1) has port membership of T1-T7 and S1-S3. This is the case in the above example because based on the network monitoring requirement Nos. 1 and 3 above, packets received at the network port N1 may be sent to any of ports T1-T7 and S1-S3 (see FIG. 3). Similarly, in the table 510, VLAN ID 200 (corresponding to network port N2) has port membership of N3, T4-T7, and S1-S3. This is the case in the above example because based on the network monitoring requirement Nos. 1 and 4 above, packets received at the network port N2 may be sent to any of ports N3, T4-T7, and S1-S3 (see FIG. 3). Also, in the table 510, VLAN ID 300 (corresponding to network port N3) has port membership of N2. This is the case in the above example based on the network monitoring requirement No. 4 above, packets received at the network port N3 may be sent to port N2.

In some embodiments, the table 510 may be automatically created by the device 100 based on input by the user of the device 100. For example, in some embodiments, by processing the packet flow mapping information (e.g., the information in the table 214), the device 100 (e.g., the processor in the device 100) can determine different sets of ports that correspond with respective network ports N (or VLAN ID), wherein each set represents all possible output ports to which a packet from a given network port N may be passed. In other embodiments, the table 510 may be created by a user of the device 100.

As illustrated in the above example, by including in the table 510 network port identification (e.g., network port identification for N2, N3, etc.) for ports that are involved in port-pairing, the device 100 may be configured to implement port-pairing using the same model that is also for packet filtering (e.g., the same model for passing packets based on destination IP address, etc.). Also, by including in the table 510 port identification (e.g., instrument port identifications T1-T3) for ports that are involved in pass-all configuration, the device 100 may be configured to implement pass-all configuration using the same model that is also for packet filtering (e.g., the same model for passing packets based on destination IP address, etc.).

It should be noted that the "second table" in item 410 of the method 400 should not be limited to the example described, and that the second table may have other configurations in other embodiments. For example, in other embodiments, the port membership may be associated with the corresponding network port identification, or may be associated with other parameter(s) that relates to the corresponding network port.

As shown in FIG. 5, the packet switch device 100 may be configured to determine (e.g., select) one of the sets of port membership from the table 510 based on the VLAN ID (or port identification) of the port at which the packet is received. In the above example, packets 1, 2 are received at port N1, which has VLAN ID=100. Thus, the packet switch device 100 will select the set of possible port(s) (i.e., ports T1-T7 and S1-S2 in the example) that corresponds to VLAND ID=100 (or that corresponds to the port identification N1) for the packets 1, 2. Similarly, packets 3, 4 are received at port N2, which has VLAN ID=200. Thus, the packet switch device 100 will select the set of possible port(s) (i.e., ports N3, T4-T7, and S1-S3 in the example) that corresponds to VLAN ID=200 (or that corresponds to the port identification N2) for the packets 3, 4. Also, packets 5, 6 are received at port N3, which has VLAN ID=300. Thus, the packet switch device 100 will select the set of possible port(s) (N2) that corresponds to VLAN ID=300 (or that corresponds to the port identification N3) for the packets 5, 6.

Returning to FIG. 4, next, the device 100 performs a logical operation using the first set of output port identifications and the second set of output port identifications to identify one or more of a plurality of output ports at the switch device 100 (Item 412). In the illustrated embodiments, the logical operation may be an AND operation, and when the device 100 performs the AND operation with respect to each of the received packets, it determines a set of port identifications that commonly exist in both the first set of output port identification obtained from the first table 508, and the second set of output port identification obtained from the second table 510.

An example item 412 in method 400 will now be described with reference to the logical operation being an AND operation. However, it should be noted that the method 400 is not limited to using an AND operation, and that in the method 400, the first and second sets of output port identifications may be combined using any logical operation. As shown in FIG. 5, and following the above example, the device 100 determines that the first set of output port identifications for packet 1 is {N3, T1-T7, S1-S3} (see packet logical flow path going through table 506 and table 508 for packet 1). Also, the device 100 determines that the second set of output port identifications for packet 1 is {T1-T7, S1-S3} (see packet logical flow path going through table 510 for packet 1). Thus, the AND operation performed by the device 100 with respect to packet 1 will identify a common set of ports={T1-T7, S1-S3} as output ports for outputting packet 1. Also, as discussed and as shown in table 514, because instrument ports T1, T2 are grouped together under LAG1 for link aggregation, one of the instrument ports T1, T2 (e.g., T1 in the illustrated example), not both, will be used. As also shown in table 514, because instrument ports T4-T6 are grouped together under LAG2 for link aggregation, one of these ports (e.g., T4 in the illustrated example) will be used. Furthermore, as shown in table 514, because stacking ports S2, S3 are grouped together under trunk group Trunk1, one of the ports S2, S3 (e.g., S3 in the illustrated example) will be used. Thus, when filtering the output from the AND operation using the instrument ports grouping and the stacking ports grouping, the packet switch device 100 will output packet 1 to instrument ports T1, T3, T4, T7, and stacking ports S1, S3 (see table 516), which is a subset of the result from the AND operation.

With respect to packet 2, as shown in FIG. 5, the device 100 determines that the first set of output port identifications for packet 2 is {N3, T1, T2, T3} (see packet logical flow path going through table 506 and table 508 for packet 2). Also, the device 100 determines that the second set of output port identifications for packet 2 is {T1-T7, S1-S3} (see packet logical flow path going through table 510 for packet 2). Thus, the AND operation performed by the device 100 with respect to packet 2 will identify a common set of ports={T1-T3} as output ports for outputting packet 2. Also, as discussed and as shown in table 514, because instrument ports T1, T2 are grouped together under LAG1 for link aggregation, one of the instrument ports T1, T2 (e.g., T2 in the illustrated example), not both, will be used. Thus, when filtering the output from the AND operation using the link aggregation grouping, the packet switch device 100 will output packet 2 to instrument ports T2 and T3 (see table 516), which is a subset of the result from the AND operation.

With respect to packet 3, as shown in FIG. 5, the device 100 determines that the first set of output port identifications for packet 3 is {N3, T1-T7, S1-S3} (see packet logical flow path going through table 506 and table 508 for packet 3). Also, the device 100 determines that the second set of output port identifications for packet 3 is {N3, T4-T7, S1-S3} (see packet logical flow path going through table 510 for packet 3). Thus, the AND operation performed by the device 100 with respect to packet 3 will identify a common set of ports={N3, T4-T7, S1-S3} as output ports for outputting packet 3. Also, as discussed and as shown in table 514, because instrument ports T4-T6 are grouped together under LAG2 for link aggregation, one of the instrument ports T4-T6 (e.g., T4 in the illustrated example) will be used. As also shown in table 514, because stacking ports S2, S3 are grouped together under trunk group Trunk1, one of the ports S2, S3 (e.g., S3 in the illustrated example) will be used. Thus, when filtering the output from the AND operation using the instrument ports grouping and the stacking ports grouping, the packet switch device 100 will output packet 3 to ports N3, T4, T7, S1, and S3 (see table 516), which is a subset of the result from the AND operation.

With respect to packet 4, as shown in FIG. 5, the device 100 determines that the first set of output port identifications for packet 4 is {N3, T1-T3} (see packet logical flow path going through table 506 and table 508 for packet 4). Also, the device 100 determines that the second set of output port identifications for packet 4 is {N3, T4-T7, S1-53} (see packet logical flow path going through table 510 for packet 4). Thus, the AND operation performed by the device 100 with respect to packet 4 will identify a common set of port(s)={N3} as output port for outputting packet 4. As shown in table 514, none of the link aggregation requirement and trunking requirement involves port N3. Thus, when filtering the output from the AND operation using the link aggregation grouping, the packet switch device 100 will output packet 4 to port N3 (see table 516).

With respect to packets 5, 6, as shown in FIG. 5, the device 100 determines that the first set of output port identifications for packets 5, 6 is {All ports} (see packet logical flow path going through table 506 and table 508 for packet 5 and packet 6). Also, the device 100 determines that the second set of output port identifications for packets 5, 6 is {N2} (see packet logical flow path going through table 510 for packet 5 and packet 6). Thus, the AND operation performed by the device 100 with respect to packets 5, 6 will identify a common set of port(s)={N2} as output port for outputting packets 5, 6. As discussed, instead of {All ports}, the set for Index=0 may alternatively be {N2} in table 508, in which cases, the AND operation will still result in {N2} being the common set of port(s) for packets 5, 6. As shown in table 514, none of the link aggregation requirement and trunking requirement involves port N2. Thus, when filtering the output from the AND operation using the link aggregation grouping, the packet switch device 100 will output packets 5, 6 to port N2 (see table 516).

As shown in FIG. 5, table 518 illustrates that the packets 1-6 will be output at various ports at the network switch device 100 based on the above result of packet flow processing. The output packets 1-6 are also graphically shown in FIG. 3. As shown in the example, the packets may be duplicated so that for a given packet, it may exit at more than one port. Thus, as used in this specification, the term "packet" may refer to the original packet received at the device 100, or one or more copy of the packet.

In other embodiments, the link aggregation for instrument ports T, and the trunking of stacking ports S, are optional. In such cases, the processing of the packets may not involve using the table 514, and the output of the AND operation (i.e., the set of ports determined from the AND operation) will be used for multicasting the packets.

In some embodiments, the packet switch device 100 may be configured to perform the above packet processing based on input by the user of the device 100. For example, based on the information shown in the tables 210, 212, 214, 216, the packet switch device 100 then automatically perform packet processing to process packets received at the network ports N so that the different network monitoring requirements (situations) may be implemented. Also, in some embodiments, based on information input by the user of the device 100 (e.g., any of the information shown in tables 210, 212, 214, 216), the device 100 may be configured to generate data and/or table(s), such as the tables 502, 504, 506, 508, 510, 514, 516, 518 shown in FIG. 5. In some embodiments, a user interface may be provided that allows the user of the device 100 to input the information (e.g., information for network ports grouping, information for instrument ports grouping, information for stacking ports grouping, information for port grouping for link aggregation, information for mapping a desirable packet flow from ingress port(s) to egress port(s) at the device 100, etc.) in a straight forward manner.

Figure 6:
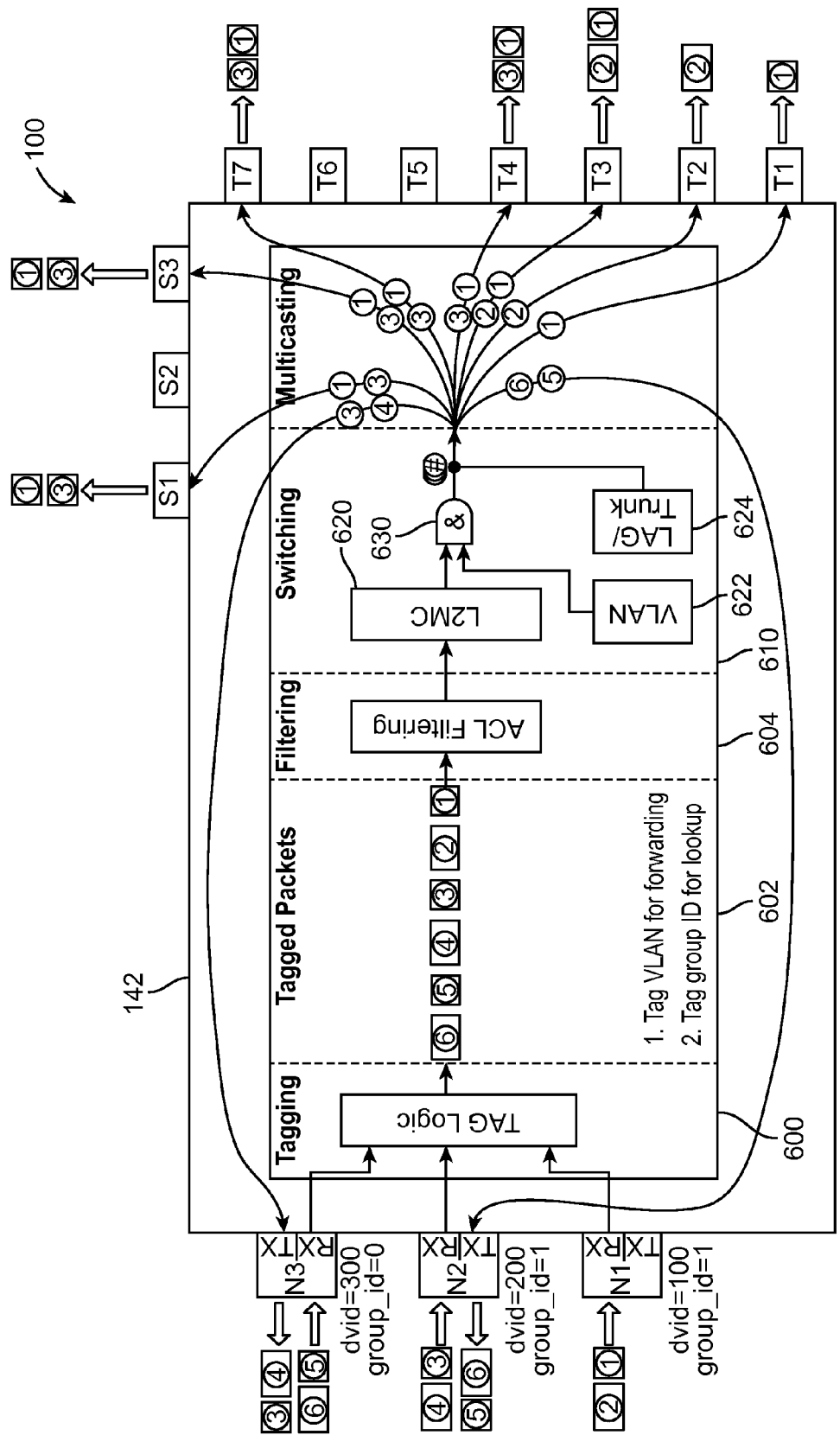
FIG. 6 illustrates a packet switch device implementing the method of FIG. 4 in accordance with some embodiments.

FIG. 6 illustrates the packet switch device 100 in accordance with some embodiments. In some embodiments, the device 100 may be configured for implementing the method of FIG. 4 and the packet processing of FIG. 5 in accordance with some embodiments. The device 100 includes a tagging module 600 for tagging the packets received from ports N1-N3. As shown in item 602, the device 100 tags the packets twice—once to tag a group ID, and again to tag a VLAN ID. In other embodiments, the device 100 may be configured to tag the packets more than twice. Also, in other embodiments, the information tagged to the packets may be different from group IDs and/or from VLAN IDs. The device 100 also includes a filtering module 604 for filtering the tagged packets. In some embodiments, the filtering module 604 is configured to process the tagged packets based on information in the table 506, so that based on the Group ID (e.g., 1 or 0 in the above example) and destination IP address, the filtering module 604 may determine a corresponding Index (e.g., 0, 11, 12, etc., in the above example).

As shown in FIG. 6, the packet switch device 100 further includes a switching module 610. The switching module 610 includes a module 620 configured to determine port membership (a set of ports) based on a given Index (like that described with reference to the first table 508 of FIG. 5), and a VLAN module 622 configured to determine port membership (a set of ports) based on a given VLAN ID (like that described with reference to the second table 510 of FIG. 5). As shown in FIG. 6, the modules 620, 622 are coupled to an AND operator 630, so that respective outputs (e.g., determined first and second sets of ports) from the modules 620, 622 are processed by the AND operator 630 to determine a set of common ports that exist in the both the first and second sets of ports. The output from the AND operator 630 is coupled to a LAG/Trunk module 624. The LAG/Trunk module 624 is configured to filter the set of output ports obtained from the AND operator 630 to a subset of output ports based on LAG IDs and/or Trunk IDs and its hash algorithm (like that described with reference to the table 514 of FIG. 5).

In some embodiments, the tagging module 600, the filtering module 604, the switching module 620, or any combination of the foregoing, may be implemented using hardware, software, or combination thereof. The hardware may include a non-transitory medium for storing information (such as port identifications, Group IDs, VLAN IDs, destination IP addresses, Indices, Trunk IDs, LAG IDs, etc.) that may be used to process the packets for transmission to intended port (s). The non-transitory medium may also store port memberships (sets of ports) that correspond with different Indices— like the examples shown in table 508, port memberships that correspond with different VLAN IDs—like the examples shown in table 510, and port memberships that correspond with different LAG groups and trunk groups, like the examples shown in table 514. In other embodiments, instead of being inside the housing 142 of the packet switch device 100, the non-transitory medium may be outside the housing 142 and is communicatively coupled to internal components of the device 100. Also, in some embodiments, any two of the components 600, 604, 610 may be combined. Furthermore, in some embodiments, any one or combination of the components 600, 602, 620 may be considered to be a part of the switch component 140 in the device 100 of FIG. 1.

Also, in some embodiments, the network switch device 100 may include an integrated circuit (e.g., the component 140) configured for performing the method 400 of FIG. 4—i.e., tagging the packet with a first identification, tagging the packet with a second identification, using the first table to determine a first set of output port identifications based at least in part on the first identification, using the second table to determine a second set of output port identifications based at least in part on the second identification, and performing an AND operation using the first set of output port identifications and the second set of output port identifications to identify one or more of a plurality of output ports at the switch device.

In some embodiments, the network switch device 100 may include a non-transitory medium storing a set of instructions, an execution of which causes the method 400 of FIG. 4 to be performed, wherein the method includes receiving a packet at one of a plurality of network ports at a switch device, tagging the packet with a first identification, tagging the packet with a second identification, using a first table to determine a first set of output port identifications based at least in part on the first identification, using a second table to determine a second set of output port identifications based at least in part on the second identification, and performing an AND operation using the first set of output port identifications and the second set of output port identifications to identify one or more of a plurality of output ports at the switch device.

As illustrated in the above embodiments, embodiments of the network switch device 100 and/or the method 400 are advantageous because one unified filtering model may be employed for all network monitoring requirements (situations). Such technique saves development time and costs, as well as time and cost required for quality assurance (which may be substantial if multiple different models are used for different network visibility situations). Such technique also solves many limitations and restrictions in the current network products (e.g., which operate based on certain models that are optimized for only certain network visibility situations, but not others). For example, as illustrated in the example discussed above, embodiments of the device 100 and method 400 described herein allow pass-all packet flow and port-pairing to be performed when doing packet filtering at the same time. Thus, relatively unlimited pass-ails and/or port-pairings may be implemented together with packet filtering. In addition, embodiments described herein allow optimized VLAN and filter resources utilization, and flexible link aggregation support for each filter. Furthermore, the embodiments of the device 100 and/or method 400 described may provide unlimited stacking of packet switches. This in turn may allow scaling to support a large amount of network ports monitoring. In addition, embodiments described herein may be implemented in any packet switch, in which filtering and multicast processing are available. For example, in some embodiments, the technique for processing packets described herein may be implemented in any packet switch that includes ACL filtering and layer-2 multicast processing capabilities. In such cases, the packet switch may be configured, based on embodiments of the techniques described herein, to utilize delicate combinations of ACL filtering, Layer-2 multicasting, and VLAN forwarding, to create a simplified and unified model for implementing all network monitoring requirements.

It should be noted that the network switch device 100 may be a network visibility switch device, a network monitoring switch device, packet flow switch device, or any device configured to obtain visibility of network traffic. Thus, embodiments described herein may be implemented using any of these types of devices.

Figure 7:
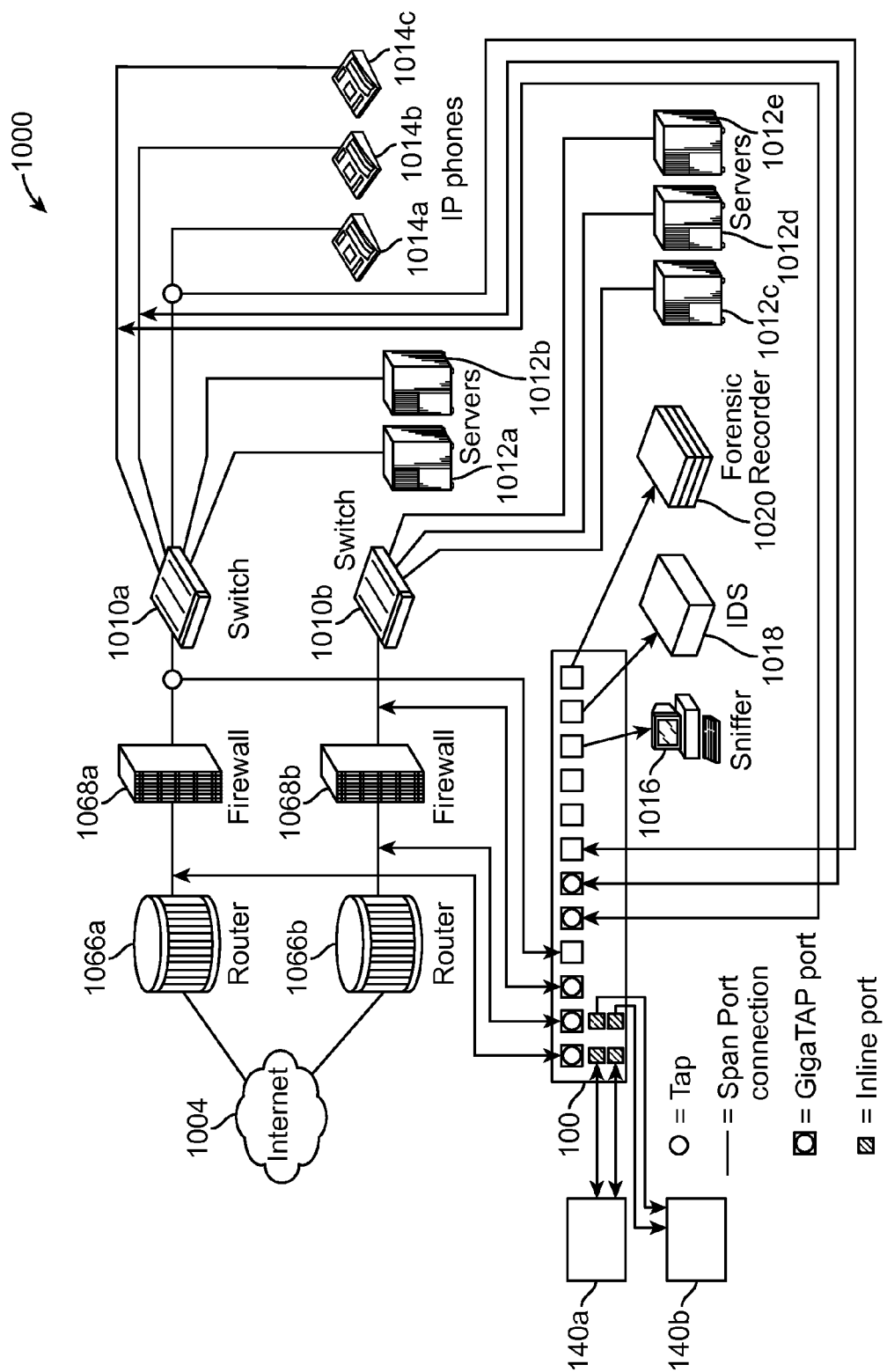
FIG. 7 shows an example of a deployment of the network switch device of FIG. 1 in a network environment in accordance with some embodiments.

FIG. 7 shows the deployment of the network switch device 100 in a network environment 1000 in accordance with some embodiments. The Internet 1004 is coupled via routers 1006a-b and firewalls 1068a-b to two switches 1010a and 1010b. Switch 1010a is coupled to servers 1012a-b and IP phones 1014a-c. Switch 1010b is coupled to servers 1012c-e. A sniffer 1016, an IDS 1018 and a forensic recorder 1020 (collectively, "non-pass through instruments") are coupled to the device 300. As illustrated in FIG. 7, there is a reduction on the number of non-pass through instruments in this deployment as compared to a conventional configuration (in which there may be one or more non-pass through instruments between router 1066a and firewall 1068a, one or more non-pass through instruments between firewall 1068a and switch 1010a, one or more non-pass through instruments between router 1066b and firewall 1068b, and firewall 1068b and switch 1010b) because the same non-pass through instruments can now access information anywhere in the network environment 1000 through the device 100. The user has complete flexibility to channel whatever traffic to whatever instrument or groups of non-pass through instruments, using the any-to-any, any-to-many and many-to-one capability of the system in accordance with the different embodiments described herein. For example, all the conversations of the IP phones 1014a-c can be easily configured to be sent to an IDS 1018. It is also possible that traffic inside a particular IP phone 1014a-c connection can be sent to a sniffer 1016, and Intrusion Detection System 1018 and a forensic recorder 1020 simultaneously via the one-to-many function. The packet processing features of the device 100 described herein allow the device 100 to process the packets based on a unified model to address any network monitoring requirements.

In some embodiments, when using the device 100, one or more non-pass through instruments (such as IDS, sniffer, forensic recorder, etc.) may be connected to instrument port(s), and one or more pass through instruments 140a, 140b (e.g., IPS) may be connected to other instrument port(s) (e.g., inline port(s)). Such configuration allows non-pass through instrument(s) and pass through instrument(s) to simultaneously monitor the network traffic. Each non-pass through instrument is in listening mode (i.e., it receives packets intended to be communicated between two nodes), and each pass through instrument is in pass-thru mode (i.e., it receives packets intended to be communicated between two nodes, processes them, and then pass the packets downstream towards the intended recipient node). In some cases, by having both an IDS and an IPS connected to the device 100, the device 100 can compare whether the IDS or the IPS sees more threats, and/or can have a redundant protection such that if the IPS misses any threat, the IDS may pick it up.

It should be noted that when a "packet" is described in this application, it may refer to the original packet that is transmitted from a node, or a copy of it.

It should be noted that the term "first" (as in "first table" for example), and the term "second" (as in "second table" for example), are used to refer to different things, and do not necessarily refer to the order of things. Thus, the term "first table" does not necessarily refer to a table that is "first" obtained, created, or accessed, and may refer to any table that is different from a "second" table. Similarly, the term "second table" does not necessarily refer to a table that is obtained, created, or accessed in the "second" order, and may refer to any table that is different from a "first" table.

Although particular embodiments have been shown and described, it will be understood that they are not intended to limit the claimed inventions, and it will be obvious to those skilled in the art that various changes and modifications may be made without departing from the spirit and scope of the claimed inventions. The specification and drawings are, accordingly, to be regarded in an illustrative rather than restrictive sense. The claimed inventions are intended to cover alternatives, modifications, and equivalents, which may be included within the spirit and scope as defined by the claims.

What is claimed:

1. A method of packet processing, comprising:
   receiving a packet at one of a plurality of network ports at a switch device;
   tagging the packet with a first identification;
   tagging the packet with a second identification, wherein the second identification is different from the first identification;
   using a first table to determine a first set of output port identifications based at least in part on the first identification;
   using a second table to determine a second set of output port identifications based at least in part on the second identification; and
   performing a logical operation using the first set of output port identifications and the second set of output port identifications to identify one or more of a plurality of output ports at the switch device.

2. The method of claim 1, wherein the logical operation comprises an AND operation.

3. The method of claim 1, further comprising selecting a subset of the one or more of the plurality of output ports for outputting the packet.

4. The method of claim 3, wherein the act of selecting is performed using a third table, the third table comprising data for grouping two or more of the plurality of output ports at the switch device.

5. The method of claim 4, wherein the plurality of output ports comprises a plurality of stacking ports, and the data in the third table are for grouping two or more of the plurality of stacking ports.

6. The method of claim 4, wherein the plurality of output ports comprises a plurality of instrument ports, and the data in the third table are for grouping two or more of the plurality of instrument ports.

7. The method of claim 1, further comprising outputting the packet to the one or more of the plurality of output ports.

8. The method of claim 1, wherein the first table is configured for layer 2 processing of the packet.

9. The method of claim 1, wherein the first table comprises an entry that includes one of the output port identifications in the first set for implementing a port pairing.

10. The method of claim 1, wherein the first table comprises an entry that includes one of the output port identifications in the first set for implementing a pass-all configuration.

11. The method of claim 1, further comprising associating the packet with an index based on a destination IP address of the packet and the first identification tagged with the packet.

12. The method of claim 11, wherein the first table comprises a set of indices that includes the index, and sets of output port identifications that are associated with the respective indices, one of the sets of output port identifications being the first set of output port identifications.

13. The method of claim 1, wherein the second table comprises a set of identifications that includes the second identification, and sets of possible output port identifications that are associated with respective ones of the identifications in the set, the second set of output port identifications being one of the sets of possible output port identifications.

14. The method of claim 13, wherein the second set of output port identifications include one or more stacking port identifications.

15. The method of claim 13, wherein the second set of output port identifications include one or more instrument port identifications.

16. The method of claim 13, wherein data in the second table correspond with one or more packet transmission rules input by a user.

17. The method of claim 16, wherein the one or more packet transmission rules comprise one or more of:
- pass all packets from one or more of the network ports with a first destination IP address to a selected one or more of the output ports;
- drop all packets from one or more of the network ports with a second destination IP address;
- pass all packets from one or more of the network ports regardless of the destination IP address associated therewith; and
- port-pair between two or more of the network ports.

18. The method of claim 1, wherein the first identification comprises a group identification for grouping one or more of the plurality of network ports.

19. The method of claim 1, wherein the second identification comprises a VLAN identification.

20. A packet switch system, comprising:
- a plurality of network ports, at least one of the plurality of network ports configured to receive a packet;
- a non-transitory medium storing a first table and a second table; and
- an integrated circuit configured for:
  - tagging the packet with a first identification;
  - tagging the packet with a second identification, wherein the second identification is different from the first identification;
  - using the first table to determine a first set of output port identifications based at least in part on the first identification;
  - using the second table to determine a second set of output port identifications based at least in part on the second identification; and
  - performing a logical operation using the first set of output port identifications and the second set of output port identifications to identify one or more of a plurality of output ports at the switch device.

21. The system of claim 20, wherein the logical operation comprises an AND operation.

22. The system of claim 21, wherein the integrated circuit is further configured to select a subset of the one or more of the plurality of output ports for outputting the packet.

23. The system of claim 22, wherein the integrated circuit is configured to perform the act of selecting by using a third table stored in the non-transitory medium, the third table comprising data for grouping two or more of the plurality of output ports at the switch device.

24. The system of claim 23, wherein the plurality of output ports comprises a plurality of stacking ports, and the data in the third table are for grouping two or more of the plurality of stacking ports.

25. The system of claim 23, wherein the plurality of output ports comprises a plurality of instrument ports, and the data in the third table are for grouping two or more of the plurality of instrument ports.

26. The system of claim 20, further comprising a plurality of output ports, wherein the integrated circuit is configured to cause the packet to be outputted to one or more of the plurality of output ports.

27. The system of claim 20, wherein the first table is configured for layer 2 processing of the packet.

28. The system of claim 20, wherein the first table comprises an entry that includes one of the output port identifications in the first set for implementing a port pairing.

29. The system of claim 20, wherein the first table comprises an entry that includes one of the output port identifications in the first set for implementing a pass-all configuration.

30. The system of claim 20, wherein the integrated circuit is further configured to associate the packet with an index based on a destination IP address of the packet and the first identification tagged with the packet.

31. The system of claim 30, wherein the first table comprises a set of indices that includes the index, and sets of output port identifications that are associated with the respective indices, one of the sets of output port identifications being the first set of output port identifications.

32. The system of claim 20, wherein the second table comprises a set of identifications that includes the second identification, and sets of possible output port identifications that are associated with respective ones of the identifications in the set, the second set of output port identifications being one of the sets of possible output port identifications.

33. The system of claim 32, wherein the second set of output port identifications include one or more stacking port identifications.

34. The system of claim 32, wherein the second set of output port identifications include one or more instrument port identifications.

35. The system of claim 32, wherein data in the second table correspond with one or more packet transmission rules input by a user.

36. The system of claim 35, wherein the one or more packet transmission rules comprise one or more of:
- pass all packets from one or more of the network ports with a first destination IP address to a selected one or more of the output ports;
- drop all packets from one or more of the network ports with a second destination IP address;
- pass all packets from one or more of the network ports regardless of the destination IP address associated therewith; and
- port-pair between two or more of the network ports.

37. The system of claim 20, wherein the first identification comprises a group identification for grouping one or more of the plurality of network ports.

38. The system of claim 20, wherein the second identification comprises a VLAN identification.

39. A computer program product having a non-transitory medium storing a set of instructions, an execution of which causes a method of packet processing to be performed, the method comprising:
- receiving a packet at one of a plurality of network ports at a switch device;
- tagging the packet with a first identification;
- tagging the packet with a second identification, wherein the second identification is different from the first identification;
- using a first table to determine a first set of output port identifications based at least in part on the first identification;
- using a second table to determine a second set of output port identifications based at least in part on the second identification; and
- performing a logical operation using the first set of output port identifications and the second set of output port identifications to identify one or more of a plurality of output ports at the switch device.

* * * * *